United States Patent [19]

Espy et al.

[11] 4,227,343
[45] Oct. 14, 1980

[54] HORTICULTURE DEVICE FOR ROTATING PLANTS DUE TO TRANSPIRATION AND EVAPORATION OF MOISTURE

[75] Inventors: Calvin Espy, 2303 Riverbrook Rd., Decatur, Ga. 30032; Thomas Goddlv, Atlanta, both of Ga.

[73] Assignee: Calvin Espy, Decatur, Ga.

[21] Appl. No.: 43,896

[22] Filed: May 30, 1979

[51] Int. Cl.³ ............................................. A47G 7/00
[52] U.S. Cl. ......................................... 47/39; 47/67; 74/424.8 R; 185/27; 248/318
[58] Field of Search .............................. 47/39, 65, 67; 74/424.8 R, 473; 40/473; 185/27; 211/1.5, 77, 78, 129, 131, 163, 166; 248/27.8, 131, 132, 522, 317, 318

[56] References Cited

U.S. PATENT DOCUMENTS

| 813,378 | 2/1906 | Hagan | 74/424.8 R |
|---|---|---|---|
| 1,080,593 | 12/1913 | Schilling et al. | 185/27 |
| 1,970,452 | 8/1934 | Grubman | 185/27 |
| 2,251,364 | 8/1941 | McIlhon | 74/127 |
| 2,699,650 | 1/1955 | Parsons | 40/473 X |
| 4,005,843 | 2/1977 | Wengel | 47/39 X |
| 4,078,625 | 3/1978 | Loeb | 47/67 X |
| 4,117,630 | 10/1978 | Kalas | 47/67 |

FOREIGN PATENT DOCUMENTS

2500 of 1894 United Kingdom .................. 47/39

*Primary Examiner*—Edgar S. Burr
*Assistant Examiner*—James R. Feyrer
*Attorney, Agent, or Firm*—John R. Moses

[57] ABSTRACT

A container for plants is rotated as water is evaporated and respirated therefrom due to the interaction between a compression spring and linear-to-rotary motion mechanism. The compression spring is disposed between the container and a stop on a support shaft suspended from above wherein the support shaft has a spiral portion thereon and the container has a slot for receiving the spiral portion. As water evaporates, weight on the compression spring is reduced and the container rises upwardly on the shaft in relation to the stop on the shaft. As the container rises, it rotates slowly. In an alternative embodiment, the shaft is rigidly fixed to a base upon which the container rests and the container includes a soil containing pot which may move relative to the base. The compression spring is disposed between a stop on the shaft and the soil containing pot to bias the pot upwardly when there is no water therein so as to raise and rotate the pot with the linear-to-rotary motion mechanism as the water evaporates.

5 Claims, 6 Drawing Figures

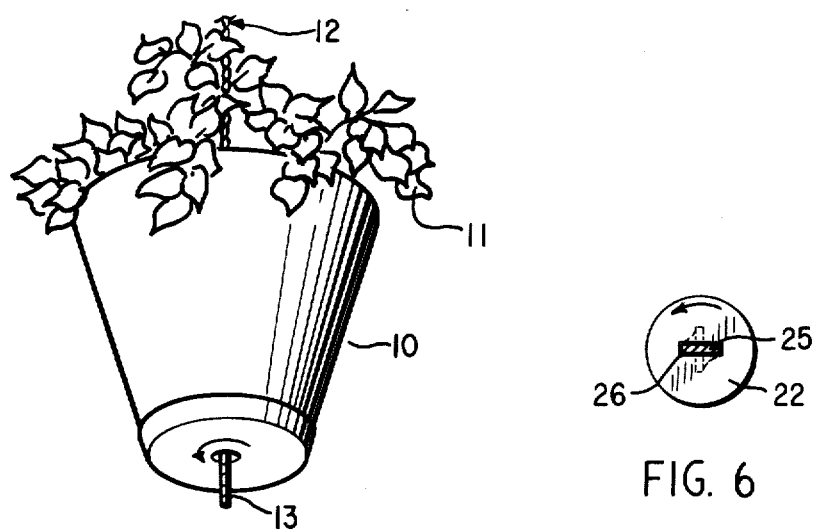
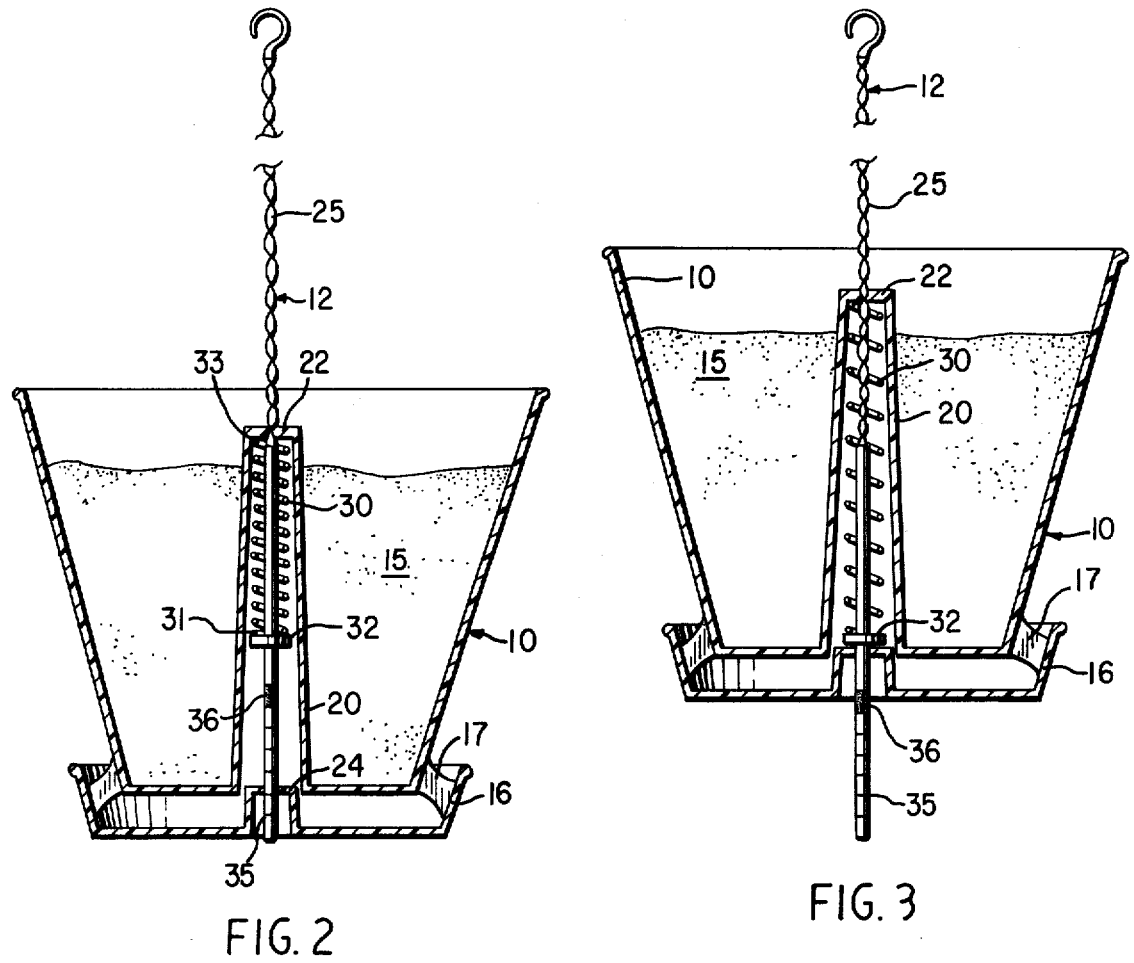
FIG. 1
FIG. 6
FIG. 2
FIG. 3

HORTICULTURE DEVICE FOR ROTATING PLANTS DUE TO TRANSPIRATION AND EVAPORATION OF MOISTURE

RELATED UNITED STATES PATENT APPLICATION

This application is related to copending U.S. Patent application Ser. No. 012,078, filed Feb. 14, 1979 in the name of Calvin L. Espy and titled "HORTICULTURE DEVICE FOR ROTATING PLANTS DUE TO RESPIRATION AND EVAPORATION OF MOISTURE".

FIELD OF THE INVENTION

This invention relates to devices for rotating plants and more particularly, this invention relates to devices for rotating plants wherein the rotation is effected by evaporation and transpiration of moisture.

BACKGROUND OF THE INVENTION

As was spelled out in the above identified, related patent application to Calvin L. Espy, it is necessary to provide plants with sufficient water as well as adequate light. In the related application this is accomplished by a device which rotates the plant as water added thereto respirates from the plant and evaporates from the container holding the plant. It is also beneficial to physically move a plant from time to time to exercise the plant structure. By using the concept taught in the related application all of these desirable ends are obtained.

In order to have a more commercially viable device, it is necessary that the mechanism effecting rotation of the plant be relatively compact. Moreover, it is desirable to match the size of the container to the rotation mechanism so that the mechanism will operate effectively.

SUMMARY OF THE INVENTION

In view of the foregoing considerations, it is an object of the instant invention to provide a new and improved device for rotating plants due to respiration and evaporation of moisture wherein the mechanism for rotating the plant is relatively compact and wherein the container in which the plants are held is integral with the mechanism and therefore necessarily has a volume appropriate to the constraints imposed by the design of the rotating mechanism.

In view of the aforecited object, and other objects, the instant invention contemplates a horticulture device including a container for a plant and a support for the container, wherein the container is movably connected to the support by a mechanism for converting linear motion to rotary motion. A compression spring is disposed between the container and the support. The spring compresses when water is added to the container and extends as water evaporates from the container and transpirates from the plant. As the spring extends the container rotates. The instant invention further contemplates an indicator showing when the container is dry so that one will know that more water is needed. In accordance with one embodiment of the instant invention, the support includes a hook or other suspension means whereby the container is hung to rotate about the support. In accordance with another embodiment, the support is a base having a shaft extending therefrom, from which shaft container is suspended.

BRIEF DESCRIPTION OF THE DRAWINGS

FIG. 1 is a perspective view of one embodiment of the horticulture device in accordance with the instant invention wherein the device is suspended from above;

FIG. 2 is a side elevation of a first embodiment of the horticulture device in accordance with the instant invention, showing the device suspended from above with the spring compressed after the plant has been watered and before the device starts to slowly rotate;

FIG. 3 is a side elevation similiar to FIG. 2 showing the device with the compression spring expanded after the water has been evaporated and respirated and after the device has been slowly rotated due to the evaporation and transpiration;

FIG. 6 is a top view of a linear-to-rotary motion mechanism used with the device shown in FIGS. 1 through 5.

DESCRIPTION OF THE PREFERRED EMBODIMENTS

Figure 4:
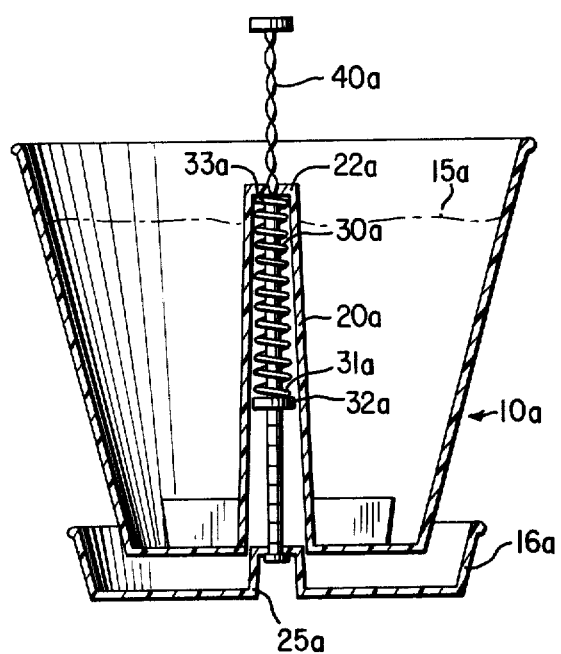
FIG. 4 is a side elevation of a second embodiment of the instant invention showing the device supported on a base and showing the spring compressed after the plant has been watered.

Referring now to FIG. 1 there is shown a container 10 for a plant 11, which container is hung by a shaft 12 with a hook thereon for rotation about the shaft as water evaporates from the container and is transpirated by the plant. Integral with the rod 12 is a projection 13 which serves as an indicator showing when the plant 11 is dry.

Referring now to FIGS. 2, 3, and 6, the container 10 has a soil containing portion or pot 15 and a base portion 16 which is attached to the soil containing portion or pot by struts 17 to form a rigid, integral unit. The base 16 serves to accommodate extra or overflow water from the pot 15. Projecting vertically within the pot 15 is a hollow pylon 20 having an upper surface 22 through which the support shaft 12 passes. Aligned with the pylon 20 is a supporting member 23, which has a bore 24 therethrough, which bore slidably receives one end of the support rod 12.

In order to cause the container 10 to rotate as water is evaporated and transpirated therefrom, the shaft 12 includes a spiral portion 25 which is received through a slot 26 in the top surface 22 of the pylon 20. As is seen in FIG. 6, the spiral portion 25 is rectangular in cross-section and the opening 26 through the top 22 of the pylon 20 is also rectangular in cross-section. Consequently, if the spiral portion 25 is kept stationary then the top 22 of the pylon 20 must rotate if it is moved axially with respect to the longitudinal axis of the spiral portion 25. Since the top surface 22 is integral with the container 10, the entire container will rotate as it moves axially on spiral portion 25. In this way the spiral portion 25 cooperates with the rectangular slot 26 to rotate the container 10.

In order to slow the speed of rotation of the container 10 relative to the shaft 12, a coiled compression spring 30 is mounted coaxially on the shaft 12 and within the pylon 20. The spring 30 has a lower end 31 abutting a stop 32 on the shaft 12 and an upper end 33 abutting the lower surface of the top portion 22 of the pylon 20. When there is no water in the container 10 as is shown in FIG. 3, the spring 30 is extended. When the spring 30 is extended the spring 30 urges the container 10 upwardly until the top of support 23 in the container abuts the flange 32. Upon adding water to the container 10 the container drops from its FIG. 3 position to its FIG. 2 position on the shaft 12, thereby compressing the spring 30. As the water evaporates from the container 10 and is respirated by transpirated the plants 11, there is decreasing weight on the spring 30 allowing the spring to expand back toward its FIG. 3 position, thereby pushing the container 10 upward. As the container 10 moves upward, the slot 26 causes the container 10 to rotate about the spiral portion 25 of the shaft 12. This rotation is directly proportional to the relatively slow speed at which the water evaporates and is respirated. For example, it may take two or three days for the water to disappear from the container 10. As the plant 11 and pot 15 lose moisture, the container 10 rotates, uniformly exposing the plant 11 to light and provides mechanical stimulation to the plant by moving the plant.

As water in the pot 15 evaporates and is transpirated by the plant, an indicating portion 35 on shaft 12 projects through the bottom of the base 16 of the container 10. As is seen in FIG. 2, when the container is full of water, the indicating portion 35 of shaft 12 is drawn back within the pylon 20. As the water leaves, the projection 35 protrudes further and further from the base 16, indicating that the water is being used up. If desired, the projection 35 can have a red or other indicating band 36 thereon which becomes visable when substantially all of the adder water has evaporated from the pot 15. The indicating portion 35 can also be used to determine how much soil to add to the pot 15. This is accomplished by watching the indicating portion 35 as soil is added to the pot 15. When the container 10 begins to move relative to the band 36 you know enough soil has been added.

Figure 5:
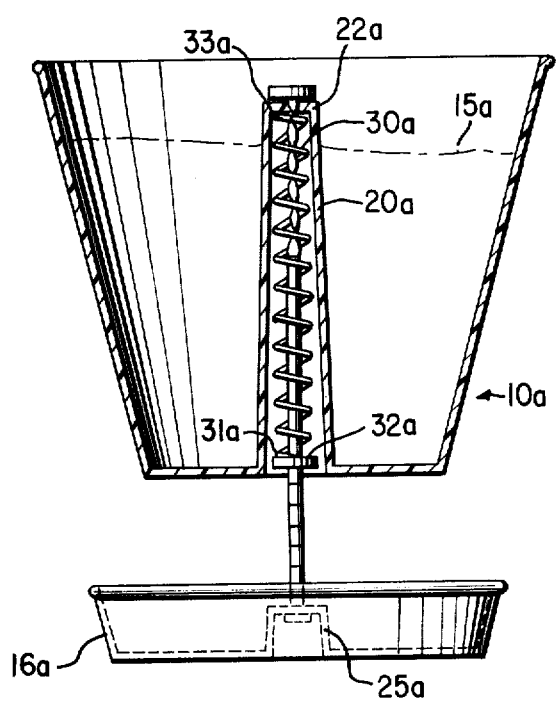
FIG. 5 is a side elevation similar to FIG. 4 showing the device after the water has been evaporated and transpirated, and after the device has been rotated

Referring now to FIGS. 4 and 5, a second embodiment of the invention is shown wherein a base 16a is separate from a soil containing pot 15a. In the second embodiment, similar reference numerals identify similar components shown in FIGS. 1, 2, 3, and 6. The base 16a has a supporting portion 23a projecting upwardly therefrom to which a shaft 12a without the hook is rigidly attached. The connecting ribs 17 have been removed in the embodiment of FIGS. 4 and 5 so that the pot 15a, can move relative to the base 16a. As is seen in FIG. 5, when there is no water in the soil containing pot 15a the spring 30a pushes the soil containing pot 15a to its upper position. When water is added to the pot 15a, the pot moves down the spiral portion 25a to compress the spring 30. As water evaporates and transpirated, the spring 30 urges the soil containing pot 15a upwardly by pressing against the underside of the top surface 22a of the pylon 20a. As the soil containing pot 15a rises, it rotates because the rectangular slot 26a cooperates with the spiral portion 25a to rotate the soil containing pot.

In the embodiment of FIGS. 4 and 5 the moisture condition of the plant and soil is readily apparent upon observing the space between the bottom of the soil containing pot 15a and the base 16a. In order to render the condition readily apparent, a portion 40a of the spiral portion 25a on the shaft 12a is visible when there is no water needed and not visible when additional water is required.

The foregoing examples are merely illustrative of the invention which should be limited only by the following claims.

We claim:

1. A horticulture device for rotating a plant, comprising;
   a container means for holding the plant and water for the plant;
   means for supporting the container;
   motion converting means disposed between the container means and the support means for converting linear motion to rotary motion;
   compression spring means disposed between the container means and support means for compression when gravitational force is applied to the container means by adding water to the container means, whereby as the water is lost from the container means the compression spring means moves the container means upward relative to the support means, said motion converting means being connected to rotate the container means as the spring means expands due to loss of water from said container means.

2. The horticulture device of claim 1 wherein the motion converting means comprises a spiral portion on the support means and a slot within the container means for receiving the spiral portion.

3. The horticulture device of claim 2 wherein the support means includes a hook for hanging the device.

4. The horticulture device of claim 2 wherein the support means includes a base upon which the device rests and wherein the compression spring means urges the container means away from the base to rotate the container means as water evaporates and transpirates therefrom.

5. The horticulture device of claim 1, 2, 3, or 4 wherein the container includes a hollow pylon extending upwardly therein and having a hortizontal top surface, wherein the horizontal top surface is abutted by one end of the compression spring and wherein the support means includes a horizontal surface fixed thereon which is abutted by the other end of the compression spring.

* * * * *